(12) United States Patent
Shechter et al.

(10) Patent No.: US 10,633,268 B2
(45) Date of Patent: Apr. 28, 2020

(54) MEMBRANE AERATED BIOFILM REACTOR

(71) Applicant: EMEFCY LTD., Caesarea (IL)

(72) Inventors: Ronen-Itzhak Shechter, Kiryat Tivon (IL); Steven D. Kloos, Naperville, IL (US)

(73) Assignee: EMEFCY LTD., Caesarea (IL)

( * ) Notice: Subject to any disclaimer, the term of this patent is extended or adjusted under 35 U.S.C. 154(b) by 0 days.

(21) Appl. No.: 15/540,131

(22) PCT Filed: Dec. 28, 2015

(86) PCT No.: PCT/IL2015/051256
§ 371 (c)(1),
(2) Date: Jun. 27, 2017

(87) PCT Pub. No.: WO2016/108227
PCT Pub. Date: Jul. 7, 2016

(65) Prior Publication Data
US 2018/0265383 A1    Sep. 20, 2018

Related U.S. Application Data

(60) Provisional application No. 62/097,089, filed on Dec. 28, 2014.

(51) Int. Cl.
*C02F 3/20* (2006.01)
*C02F 3/10* (2006.01)
(Continued)

(52) U.S. Cl.
CPC .............. *C02F 3/208* (2013.01); *B01D 63/02* (2013.01); *B01D 63/04* (2013.01); *C02F 3/102* (2013.01);
(Continued)

(58) Field of Classification Search
CPC ...... B01D 63/02; B01D 63/04; B01D 63/046; B01D 2313/23; B01D 2313/10;
(Continued)

(56) References Cited

U.S. PATENT DOCUMENTS 4,775,471 A * 10/1988 Nagai .................. B01D 63/024
  210/323.2
7,591,950 B2 * 9/2009 Zha ........................ B01D 61/18
  210/195.2
(Continued)

FOREIGN PATENT DOCUMENTS

| CA | 2 458 566 A1 | 8/2004 |
| KR | 10-2012-0048621 A | 5/2012 |
| WO | 2008/130885 A2 | 10/2008 |

*Primary Examiner* — Nam X Nguyen
*Assistant Examiner* — Julia L. Wun
(74) *Attorney, Agent, or Firm* — Vorys, Sater, Seymour and Pease LLP

(57) ABSTRACT

Provided is a water treatment module including a bundle of hollow fiber membranes that includes a treatment portion extending between bottom and top ends and at least one gas diffuser. The membranes may be gas permeable and water impermeable. At least one end of the hollow fiber membranes is linked to a source of biofilm growth-supporting gas (BGSG) and configured to permit inlet of said BGSG into the hollow fiber membranes. Also provided herein are devices, systems and methods making use of the module.

20 Claims, 12 Drawing Sheets

(51) Int. Cl.
    *C02F 3/26*      (2006.01)
    *B01D 63/02*     (2006.01)
    *B01D 63/04*     (2006.01)

(52) U.S. Cl.
    CPC ............ *C02F 3/26* (2013.01); *B01D 2313/23* (2013.01); *B01D 2313/26* (2013.01); *B01D 2315/06* (2013.01); *Y02W 10/15* (2015.05)

(58) Field of Classification Search
    CPC ......... B01D 2313/105; B01D 2315/06; Y02W 10/15; C02F 3/102; C02F 3/20; C02F 3/201; C02F 3/208; C02F 3/26
    USPC ............... 210/615, 500.21, 500.23, 252, 253
    See application file for complete search history.

(56) References Cited

U.S. PATENT DOCUMENTS

| | | | |
|---|---|---|---|
| 8,528,745 B2 * | 9/2013 | Husain | B01D 63/043 210/500.23 |
| 2013/0146518 A1 * | 6/2013 | Suk | B01D 63/021 210/236 |

* cited by examiner

MEMBRANE AERATED BIOFILM REACTOR

TECHNOLOGICAL FIELD

This disclosure concerns a membrane aerated biofilm reactor (MABR) water treatment technology.

BACKGROUND ART

References considered to be relevant as background to the presently disclosed subject matter are listed below:
International Patent Application Publication No. WO 2008/130885.

Acknowledgement of the above references herein is not to be inferred as meaning that these are in any way relevant to the patentability of the presently disclosed subject matter.

BACKGROUND

Membrane aerated biofilm reactor (MABR) systems typically utilize microorganisms for removing organic pollutants present in the water to be treated. In some MABR systems, biofilm grows on a gas permeable membrane by supply of oxygen and soluble organic compounds to the biofilm.

WO 2008/130885 describes a membrane supported biofilm apparatus having a plurality of hollow fiber gas permeable membranes in a tank containing water to be treated. The membranes have an outside diameter of about 200 microns or less and occupy between 0.5% and 4% of the tank volume and biofilm is supported on the membranes within the to be treated.

General Description

The present disclosure relates to a membrane aerated biofilm reactor (MABR) technology. Provided are water treatment modules, reactors, systems and methods embodying this technology.

Biological water treatment systems such as those employing MABR technologies tend to get clogged by the development of excess biofilm on the exterior surface of the membranes during operation, specifically with suspended solids in the water, thus resulting in decline in performance of the water treatment system. One of the beneficial effects of the MABR technology of this disclosure is a reduction in such clogging.

The MABR of this disclosure comprises a bundle of hollow fiber membranes and a gas diffuser configured for discharging gas bubbles that rise through and within confines of a treatment portion of the bundle of hollow fiber membranes.

Accordingly, provided, by one embodiment of this disclosure, is a water treatment module comprising a bundle of hollow fiber membranes that are gas permeable and water impermeable. The bundle of hollow fiber membranes comprises a treatment portion that extends between a bottom end and a top end of the bundle of hollow fiber membranes and comprises at least one gas diffuser. The bundle of hollow fiber membranes are linked, at one or both of their two ends, to a source of a first type of gas which is a gas of a kind that supports biofilm growth and are configured to permit inlet of that first type of gas into the respective end. This gas is supplied into the lumen of the hollow fibers for the purpose of diffusing through the membrane into the water and thereby support biofilm growth. This gas will be referred herein as "biofilm growth-support gas" or in abbreviation as "BGSG".

The at least one gas diffuser is functionally associated with the bottom end of the bundle (for example, may be integrally formed with or placed in the vicinity of) and is configured for discharging gas bubbles within the bundle's confines such that in operation gas bubbles rise through the treatment portion between the fibers. In other words, the gas bubbles discharged out of the at least one diffuser drifts upwardly within the confines of the bundle, at least at the treatment portion thereof and lead to scouring of excess biofilm off the membranes, agitation and mixing of water in the hollow fiber membranes' vicinity. The gas supplied to and discharged out of the at least one diffuser will be referred to herein as "auxiliary gas" or in abbreviation as "AG". As will also be noted below, the BGSG and the AG may be the same or may be different gasses.

Provided by another aspect of the present disclosure is a water treatment reactor that comprises one or more modules of this disclosure.

Provided by a further aspect of the present disclosure is a water treatment system that comprises one or more water treatment tanks, one or more water treatment modules within each of the tanks, and one or more gas conduit arrangements. Each of the one or more water treatment modules may be that described above and comprises a bundle of hollow fiber membranes that are gas permeable and water impermeable. Within the system, each of the bundles has a general vertical orientation with a treatment portion extending between a bottom end and top end of the bundle. At least one gas diffuser is functionally associated with the bottom end of the bundle and is configured for discharging bubbles of an AG within the bundle's confines such that these gas bubbles rise through the treatment portion between the hollow fibers. At least one of the one or more gas conduit arrangements is configured for supply of BGSG to one end of the fibers to permit gas inlet into the lumen of the hollow fibers. The gas conduit arrangement is also configured for supply AG to the at least one diffuser. In some embodiments, the conduit arrangement for supply of the AG and for supply of the BGSG will be different, even where the AG and the BGSG are the same gas, as the supply regiment may usually be different.

The gas conduit arrangement for the AG will be referred to herein as the "AG conduit arrangement" and that of the BGSG as the "BGSG conduit arrangement" and the respective gas sources will be referred to as "AG source" and "BGSG source"). The AG source and the BGSG source may be pressurized gas tanks, may be gas pumps or their combinations. The AG and BGSG conduits arrangements may include also gas pressure regulators, valves, other flow regulators, etc., to properly control gas flow rate, pressure and supply schedule, as needed.

The BGSG is selected according to the type of biofilm to be grown on the membranes, which in turn depends on the type of pollutants in the water to be treated. Specifically, the gas can be air, air enriched with oxygen or air supplemented with methane, pure oxygen, pure methane or any methane- or oxygen-containing gas. For example, where the water to be treated comprises organic matter and/or ammonium compounds, the water-treatment gas is typically one that is rich in oxygen. Where the water to be treated comprises nitrogen oxides containing compounds (e.g. nitrate), the water-treatment gas can be also one that is rich in methane.

By a yet further aspect, this disclosure provides a water treatment method that comprise treating water in a membrane aerated biofilm reactor, and discharging gas bubbles such that the bubbles rise through and within confines of a treatment portion of a bundle of hollow fiber membranes of the reactor.

According to one embodiment of this method water to be treated is brought into contact with one or more treatment modules, of the kind described herein. The BGSG is introduced into the lumen of the hollow fibers (typically passed therethrough from one end to the other) and the AG is caused to discharge out of the diffusers such that gas bubbles rise through the treatment portion within the confines of the bundle and between the fibers.

By one embodiment, the fibers are held together tightly in at least one of the bottom end and top end of the bundle. This tight holding may be by means of a potting element fitted at one or both of the bottom or top ends of the bundle. The AG gas diffuser may, by some embodiments, be integral with the potting element at the bottom end of the bundle. The potting element may be a cast element; e.g. cast over the end portions of the fibers.

By one embodiment, the at least one gas diffuser comprises a gas outlet that are positioned within the confines of the bundle's bottom end.

By other embodiments, the at least one gas diffuser comprises gas outlets positioned outside the confines of the bundle's bottom end portion. The module in this embodiment also comprises a channeling element for directing/forcing the discharged gas bubbles to flow into the confines of the bundle and thereby through the hollow fibers of the bundle. Such a channeling element may be in the form of a sleeve element enveloping a least the bottom end of the bundle, and the majority of the treatment portion. In some embodiments, the channeling element envelops the bottom end and the treatment portion of the bundle of hollow fibers.

The discharge of the gas bubbles from the at least one diffuser may be continuous, by some embodiments, and intermittent by others.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

The present disclosure will now be elaborated upon with reference to some specific embodiments, schematically illustrated in the attached Figures. Among others, it is to be noted that the dimensions of structural elements in the Figures are not to scale with respect to one another.

As will readily be appreciated, the illustrated embodiments are intended as examples of the general teaching including the modules, reactors, systems and methods of this disclosure. As will also be appreciated, the current disclosure is by no means limited to these specific embodiments.

Figure 1A:
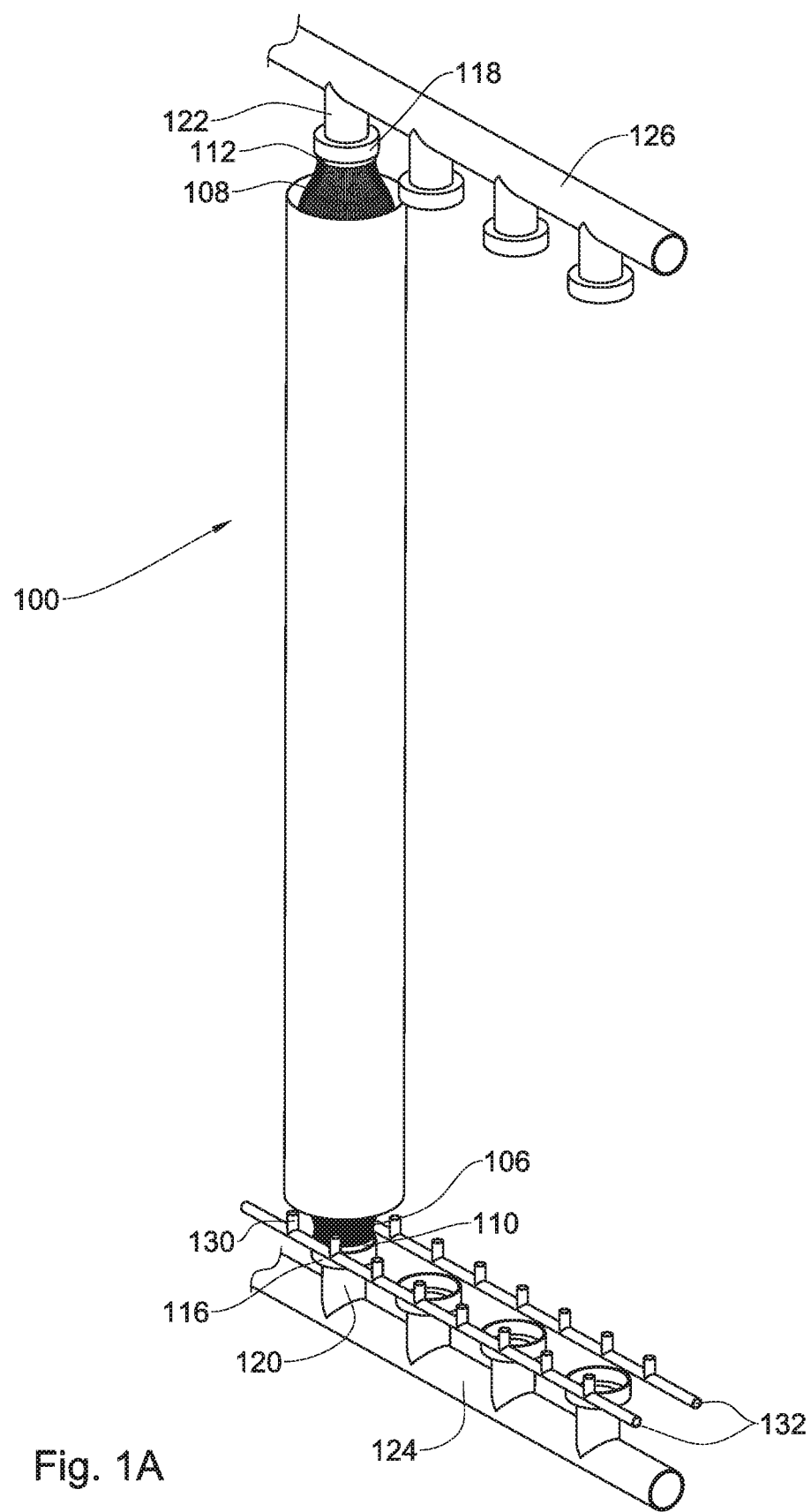
FIGS. 1A, 1B and 1C are schematic illustrations of a water treatment module in accordance with an embodiment of the present disclosure, including a perspective view (FIG. 1A), an exploded view of this module (FIG. 1B) and a cross-sectional view of a bottom portion with some of the central fibers not shown for the purpose of illustration (FIG. 1C).
Figure 1B:
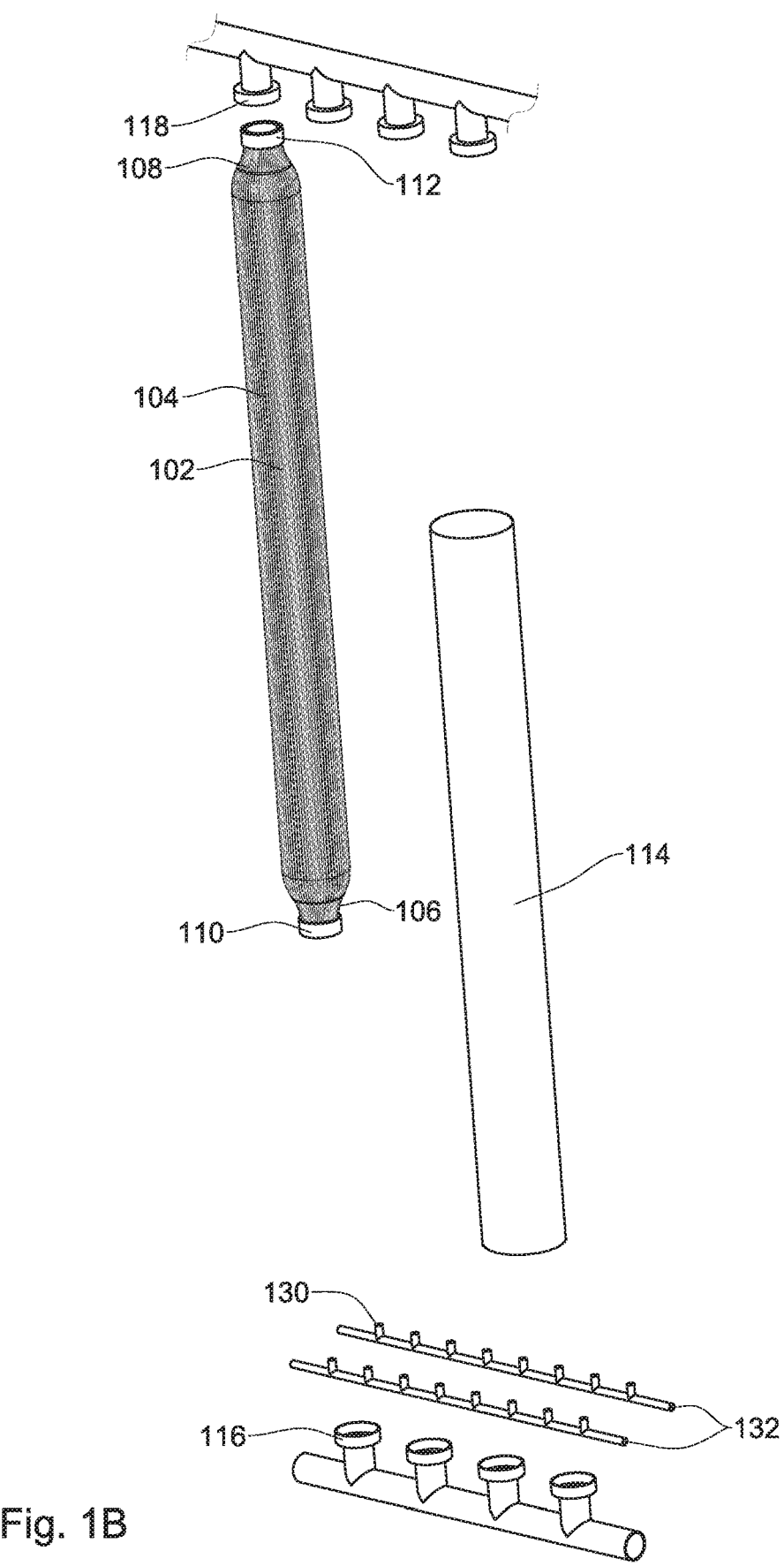
Figure 1C:
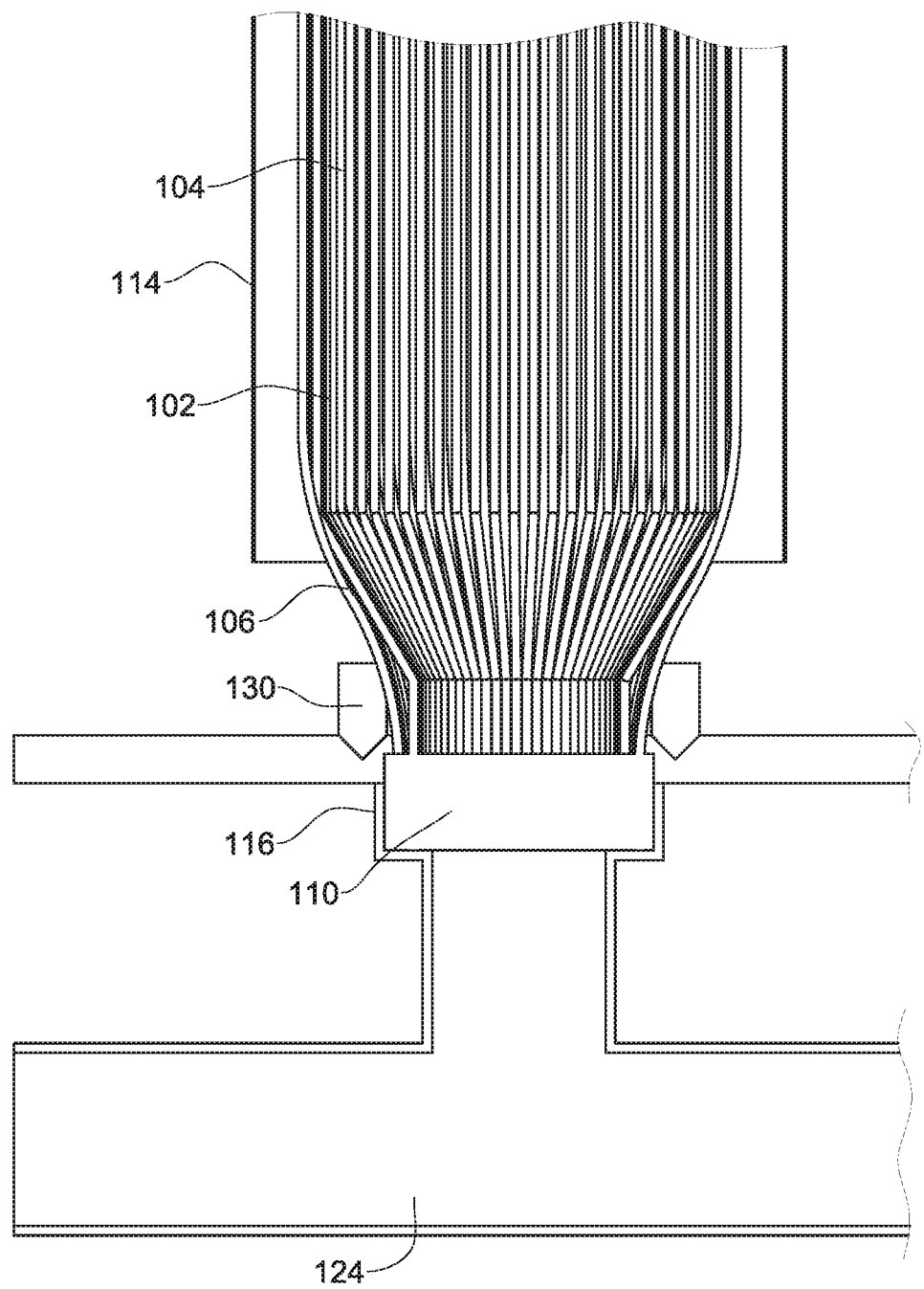
Figure 2A:
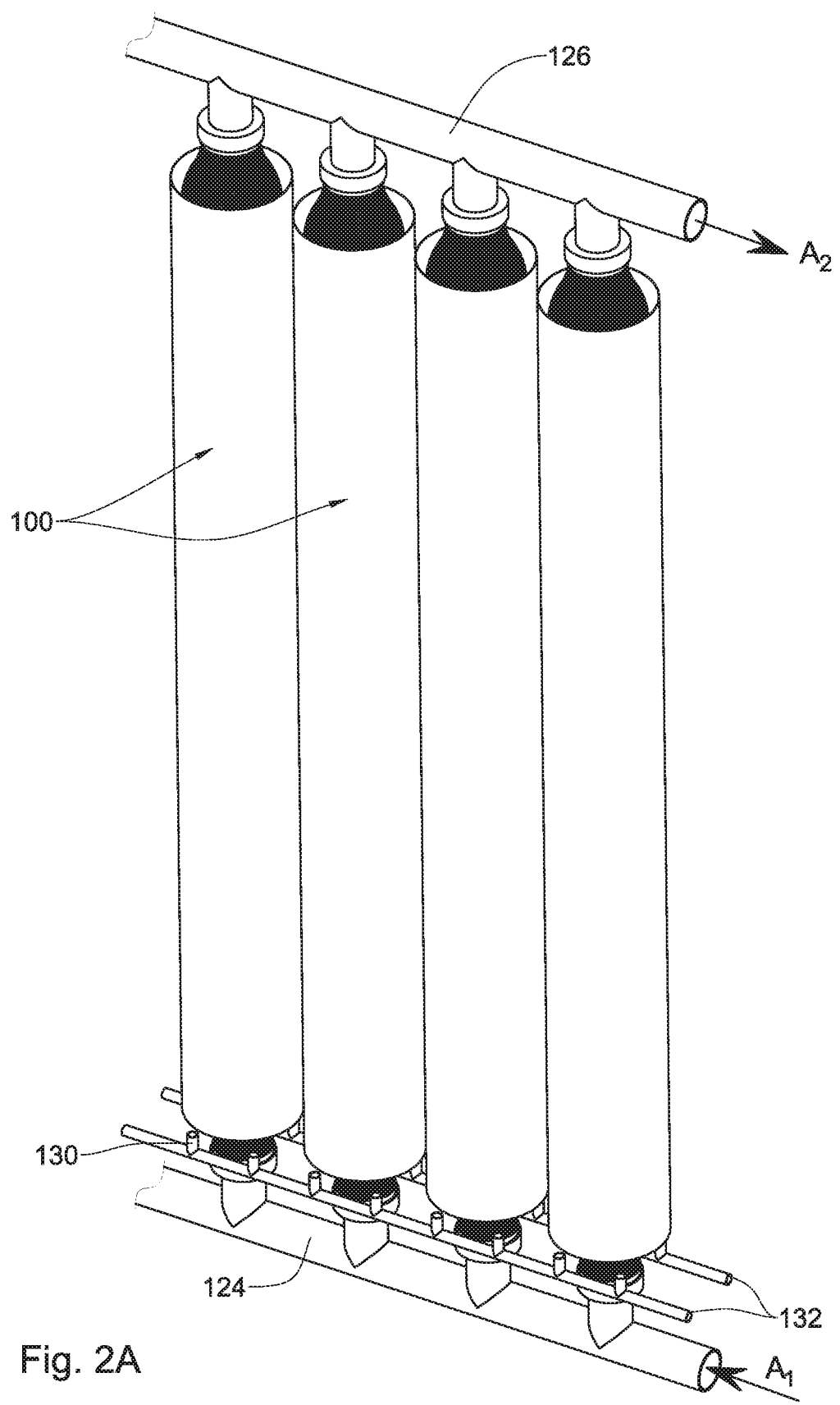
FIGS. 2A and 2B are schematic perspective views of a group of water treatment modules of the kind shown in FIGS. 1A-1C (FIG. 2A) and an enlarged partial side view of the stack (FIG. 2B).
Figure 2B:
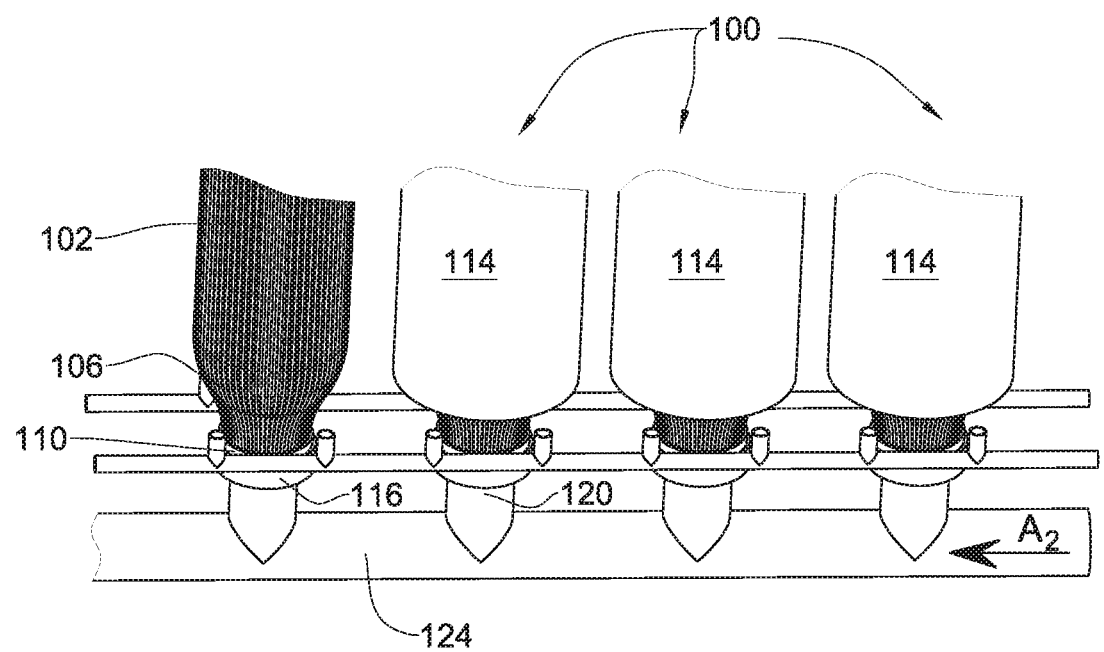

A module of a membrane aerated biofilm reactor (MABR), according to an embodiment of this disclosure, is shown in FIGS. 1A-1C as element 100. A group of such modules is shown in FIGS. 2A-2B. In FIG. 2B one of the sleeves (discussed below) is removed from one of the modules for illustrative purposes.

The module is the basic operational unit of a reactor of this disclosure. Some reactors and systems embodying the principles of this disclosure may include a single module; while in other embodiments, a plurality of modules may be included in a reactor and system. The modules may be arranged in groups, for example, configured into a linear array of the kind illustrated in FIGS. 2A-2B or into a 2-dimensional array. An MABR tank according to this disclosure may include one or a plurality of such arrays.

The module 100 seen in FIGS. 1A-1C includes a bundle 102 of hollow fiber membranes (with some of the central fibers not shown for the purpose of illustration). The membrane may be made from a variety of gas permeable and water impermeable polymers. The polymers may, for example, be selected from polydimethylsiloxane (PDMS), polymethylpentene (PMP), polyvinylidene fluoride (PVDF) and polysulfone. Specific examples of such polymers include: TPX, marketed by Mitsui Chemicals, Japan; PDMS (silicone rubber), marketed by Dow Corning, USA; Kynar (PVDF), marketed by Arkema, USA.

The bundles of hollow fibers may, for example, be modules of the kind which is commercially available, including: ZeeWeed™ (GE Water, USA); Puron® (Koch, USA); MemPulse® MBR (Evoqua, USA).

The module 100 is typically entirely submerged in the water to be treated. The bundle 102 has a treatment portion 104 extending between bottom end 106 and top end 108. The bottom end 106 and top end 108 of the bundle 102 are held by respective top potting element 112 and bottom potting element 110 that are illustrated as cast elements (that are cast over the end portions of the hollow fibers). The hollow fibers in the bundle 102 are held tightly together at their two ends 106 and 108 by the potting elements 110 and 112, respectively and are more loosely packed throughout the treatment portion 104. The bundle 100, which is generally cylindrically shaped (e.g., having an essentially circular cross-section), is enveloped by a sleeve 114 that, among others, serves the function of confining gas bubbles emitted by the diffusers (discussed below) to the treatment portion 104 during their upward rise. Sleeve 114 may be supported in position by a supporting structure, for example by hooks or cables extending from a top support rack; by bottom support rack or legs; or by resting on the BGSG supply pipe, as shown in the exemplary embodiment of FIGS. 3A-3C.

As will be further illustrated below, the module 100 having a generally cylindrical cross-section is but an example and, in other embodiments, the modules disclosed herein may be configured to have a cylindrical oval cross-section or may have a generally prismatic structure, e.g. of the kind illustrated in FIGS. 5A-5D described below.

The potting elements 110, 112 are fitted into respective bottom fitting 116 and top fitting 118 formed at an end of respective connecting tubes 120, 122 linked to and extending from respective gas lines 124, 126 that are linked to a BGSG conduit arrangement (not shown). The potting elements 110, 112 are configured, in a manner as known per se, to enable gas inflow or outflow into or out of the hollow fibers. Thus, through this arrangement there is gas communication between gas lines 124, 126 through the lumens of the hollow fibers.

In one embodiment, the BGSG is supplied by line 124 from a BGSG source (not shown) and is then discharged by line 126 that ducts excess BGSG to circulate it, for example, back to the BGSG source or to duct it to an exhaust outlet, from where it may be released into the atmosphere. This flow direction is represented by arrows A1 and A2 in FIGS. 2A-2B. As will be appreciated, this, of course, is but an example and BGSG conduit arrangement may be configured for an opposite direction of flow, thus switching the roles of lines 124, 126. In some embodiments the BGSG may also be provided through both lines and is then discharged only through the membrane into the water to be treated.

The BGSG is supplied to the hollow fibers and permeates/diffuses through the fibers' membranes into the water surrounding the hollow fibers. As a result, biofilm growth takes place along the fibers' exterior surface, i.e. the fibers' surface facing the water.

The BGSG is selected so as to be biofilm supportive in line with the nature of the contaminants/pollutants in the water to be treated. The BGSG, as known per se, may be oxygen, methane, air, etc.

The modules 100 also include diffusers 130 fitted around the periphery of the bottom end 106 and potting element 110 but below sleeve 114 and within the confines of an area defined by the sleeve 114. There are four diffusers in this specific embodiment for each module but this too, as can also be appreciated, is but an example and any reasonable number of diffusers (e.g. 2, 3, 5, 6) may be included in a module of this disclosure.

Furthermore, whereas in this embodiment the diffusers 130 are arranged around the periphery of the module's bottom end 106, in other embodiments, as will be exemplified below, one or more diffusers may also be included within the bottom end of the bundle, in addition or in the alternative to peripherally positioned diffusers of the kind included in the embodiments of FIGS. 1A-2B.

FIGS. 1A-1C and 2A-2B also illustrate AG supply line 132 which are part of an AG conduit arrangement (not illustrated). The gas diffusers 130, are fitted on the AG supply lines 132, that are linked to and configured to supply gas from an AG source (not shown). Diffusers 130 are configured for discharging gas bubbles into the water volume of module 100. The AG may be the same as or different than the BGSG. A specific example of AG is air.

Given the relative position, bottom end of sleeve 114 serves as a channeling element for channeling the AG bubbles into the confines of the bundle 102 during their upward rise, after their discharge by the diffusers 130. The relatively loose packing of the bundles throughout the treatment portion 104 permits distribution of the AG bubbles throughout the bundles.

The confined rising path of the discharged AG bubbles within the bundle of fibers results in scouring of excess biofilm off the outer surface of the hollow fibers' membrane as well as the agitation and mixing of water confined within the sleeve. As a result, there is relatively low level of clogging between the hollow fibers (typically occurring from biomass over accumulation on the exterior surface of hollow fiber membranes in MABR systems) and the fibers are generally maintained free from each other at the treatment portion of the module. In addition to reducing overall clogging, and hence lessening of maintenance efforts, the water turbulence by the gas bubbles also improves efficiency of water treatment by homogenizing water and suspended solids.

The AG conduit arrangement may be designed for continuous or intermittent gas discharge. For example, the AG discharged out of the diffusers may be designed to occur for a few seconds once every few minutes (e.g. 10-30 seconds every 5-20 minutes) or for a few minutes once every few hours (e.g. 1-10 minutes once or twice a day), etc. As can be appreciated, the AG discharge may be designed to occur both for a few seconds every few minutes, for mixing, and for a few minutes every few hours, for scouring. In addition, the AG delivery schedule may be adapted for modification as needed, either automatically or manually.

As shown in FIGS. 2A-2B, the modules 100 in this embodiment are arranged in a group of four. However, as noted above, this is but an example and such a group can include any number of modules based on a variety of engineering considerations as well as on the basis of available commercial elements of the system.

Figure 3A:
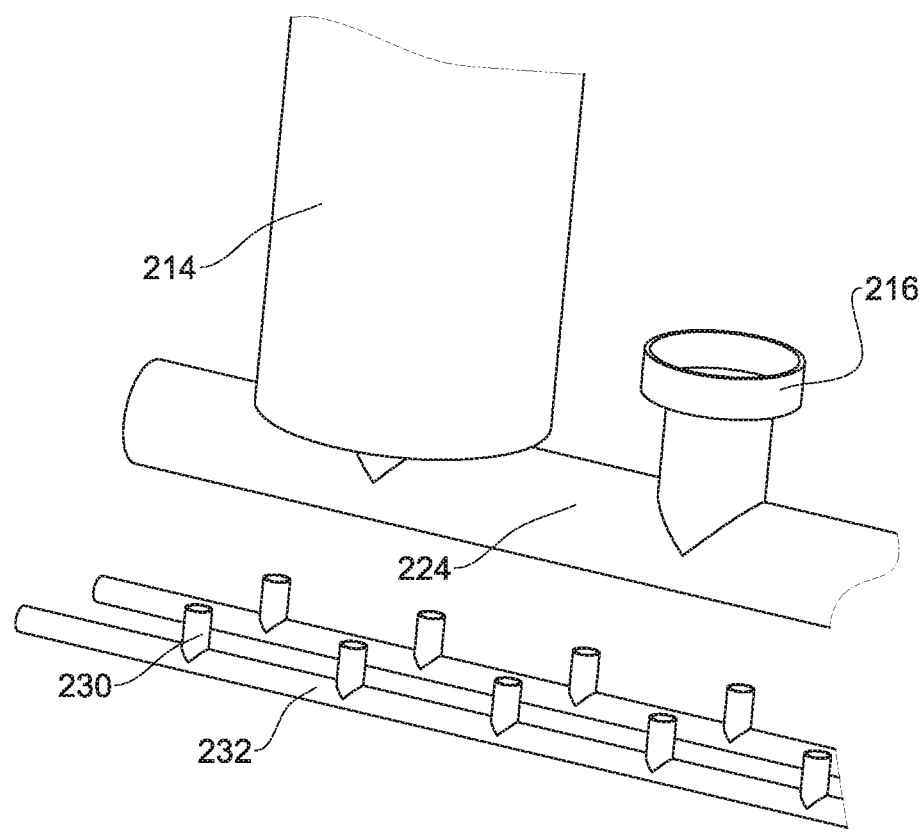
FIGS. 3A, 3B and 3C are schematic illustrations of another embodiment of a water treatment module of this disclosure including a side perspective view (FIG. 3A), a bottom perspective view (FIG. 3B) and a longitudinal perspective cross-sectional view with some of the central fibers not shown for the purpose of illustration (FIG. 3C).
Figure 3B:
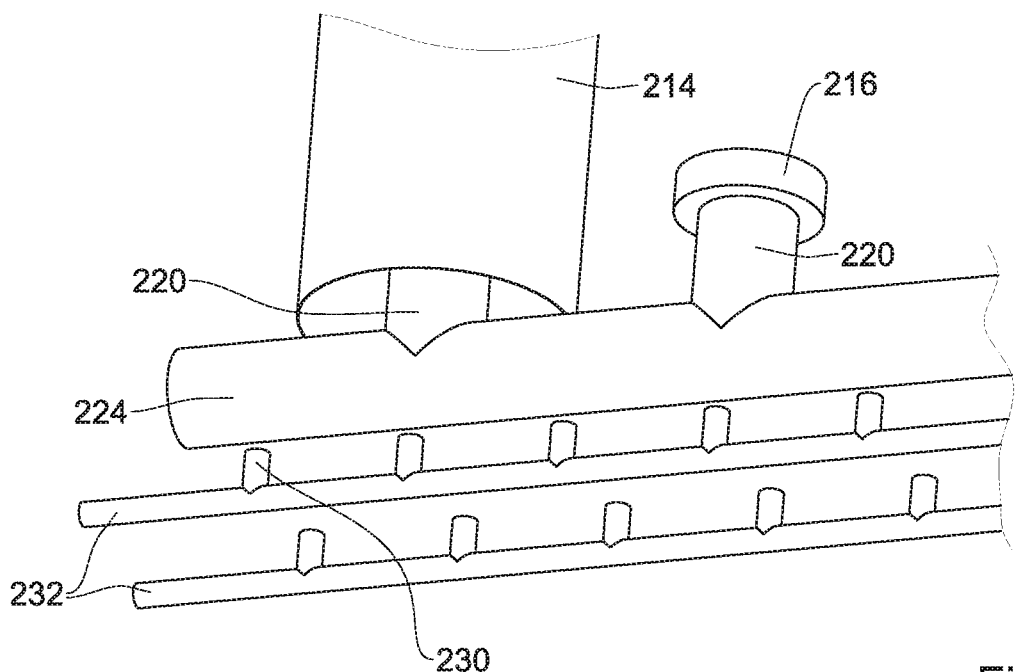
Figure 3C:
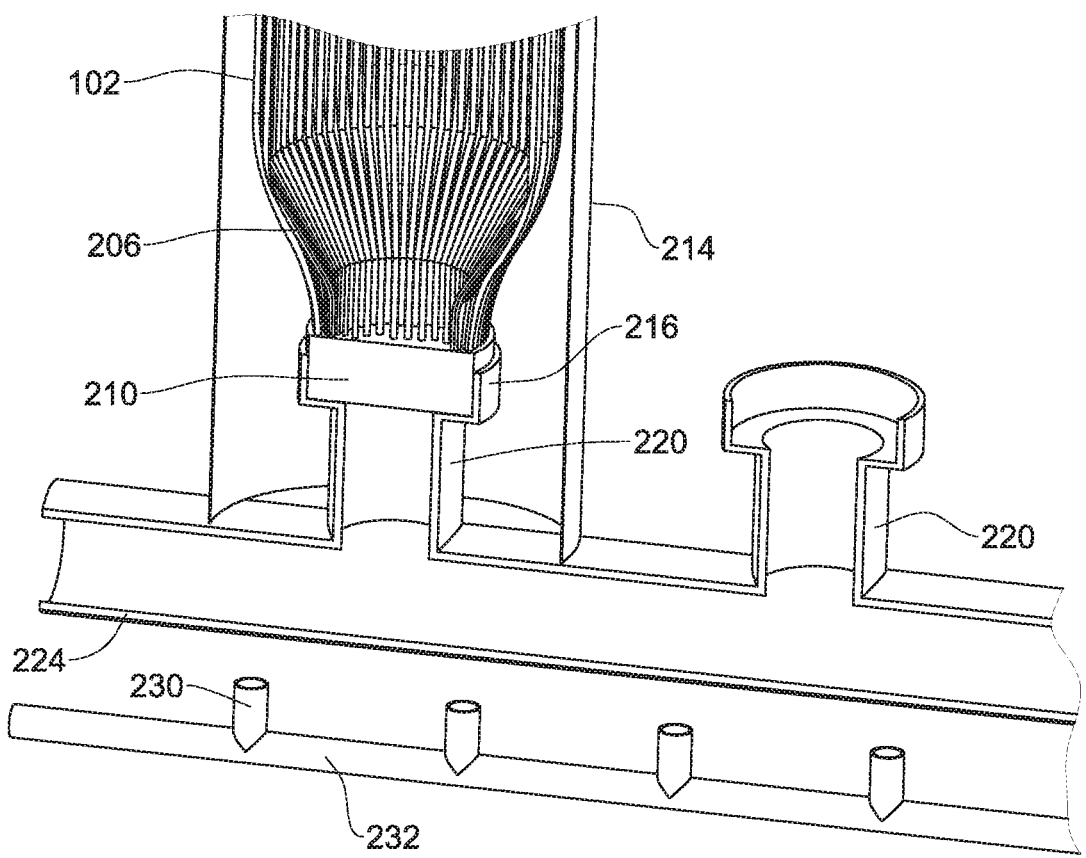

FIGS. 3A-3C show another embodiment of a module of this disclosure, which is a modification of the FIGS. 1A-1C. In FIGS. 3A-3C, like elements are indicated with the same reference numeral shifted by 100. Thus, for example, sleeve 214 serves the same function as sleeve 114 of the above embodiment. The differences in the embodiment of FIGS. 3A-3C from that of FIGS. 1A-1C is two basic features. First, as can be seen, sleeve 214 rests on and is supported in position by the BGSG line 224. Furthermore, the AG supply line 232 with the associated diffusers 230 is position at a level below line 224. Otherwise the function of this element is similar to that of the embodiment of FIGS. 1A-1C.

Figure 4:
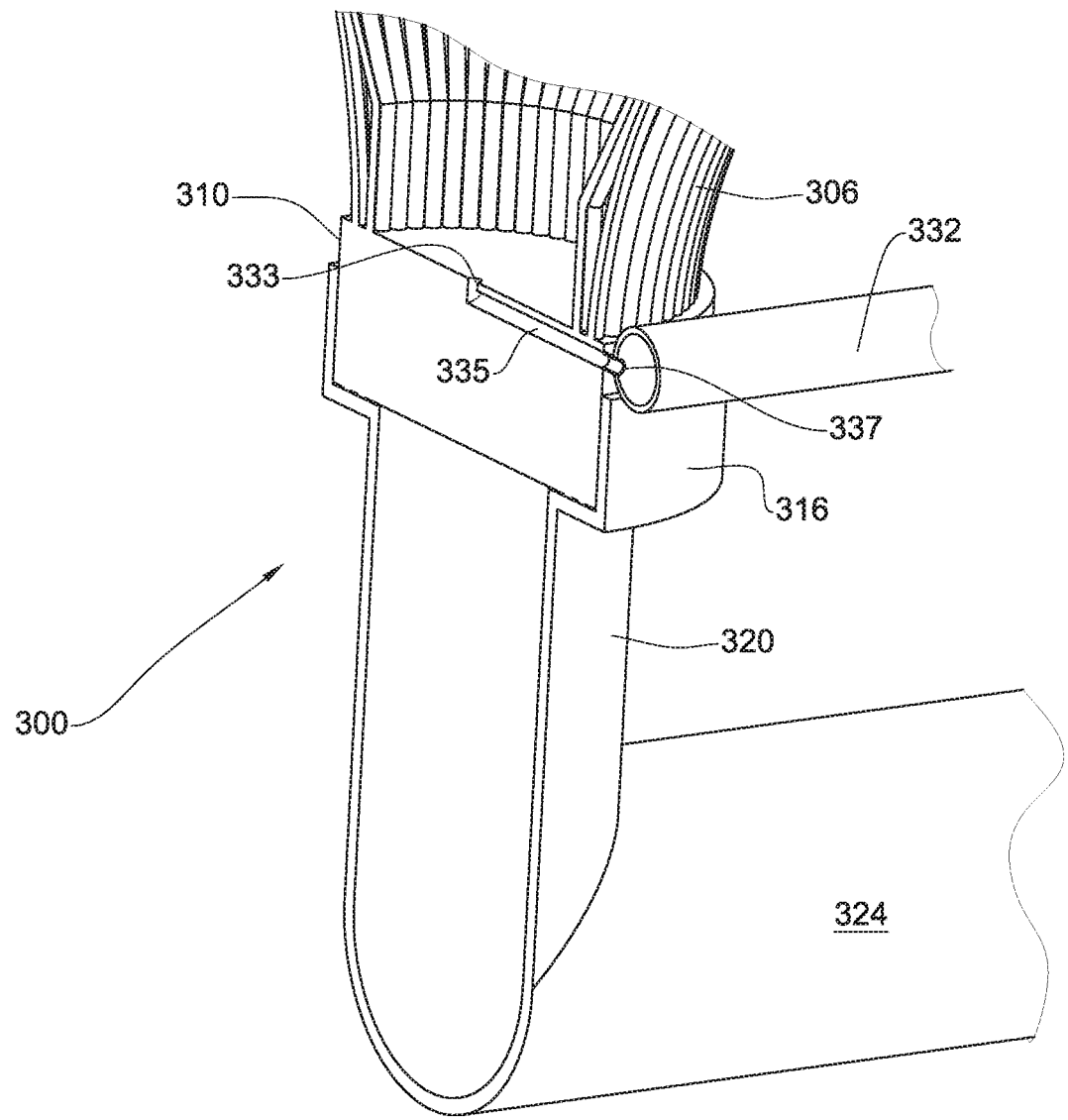
FIG. 4 is a schematic, perspective cross-sectional view of a bottom portion of a module with some of the central fibers not shown for the purpose of illustration according to another embodiment of this disclosure.

FIG. 4 is a schematic perspective cross-section of the bottom end of a module of another embodiment. In this figure like elements to those of the embodiments illustrated in FIGS. 1A-2B have been given like reference numerals shifted by 200. Thus, for example, connecting tube 320 serves the same function as connecting tube 120 of the described embodiment. The reader is referred to the description of FIGS. 1A-2B for understanding the function of these elements.

The module of this embodiment, generally designated 300, has an overall very similar structure to that of module 100 and, among others, may include a sleeve surrounding the treatment portion (shown in FIG. 4 is an embodiment that is devoid of a sleeve). The distinction between module 300 and module 100 resides in the diffuser arrangement. In the embodiment of FIG. 3, rather than a number of diffusers positioned peripheral to the bottom end of the bundle, a diffuser is configured as a nozzle 333 integrally formed within potting element 310 and centrally positioned within the bottom end 306 of the bundle of fibers. Nozzle 333 is linked by conduit or tube 335, also integrally formed within potting element 310 through coupling element 337 projecting from the side of potting element 310, to an AG supply line 332.

In other embodiments, the diffuser arrangement may include several diffuser nozzles formed in the potting element; for example, one at the center and several more peripherally positioned.

Diffusers configured to discharge gas bubbles within the bundles may also be such that are not integrally formed within the potting element. In addition, as also noted above, by some embodiments the diffuser arrangement may include a combination of diffusers configured to discharge AG bubbles within the bundle's bottom end portion, integrally formed in the potting element or not, and diffusers configured for discharging gas peripherally to the bottom end portion of the bundle, e.g. of a kind shown in FIGS. 1A-2B.

Figure 5:
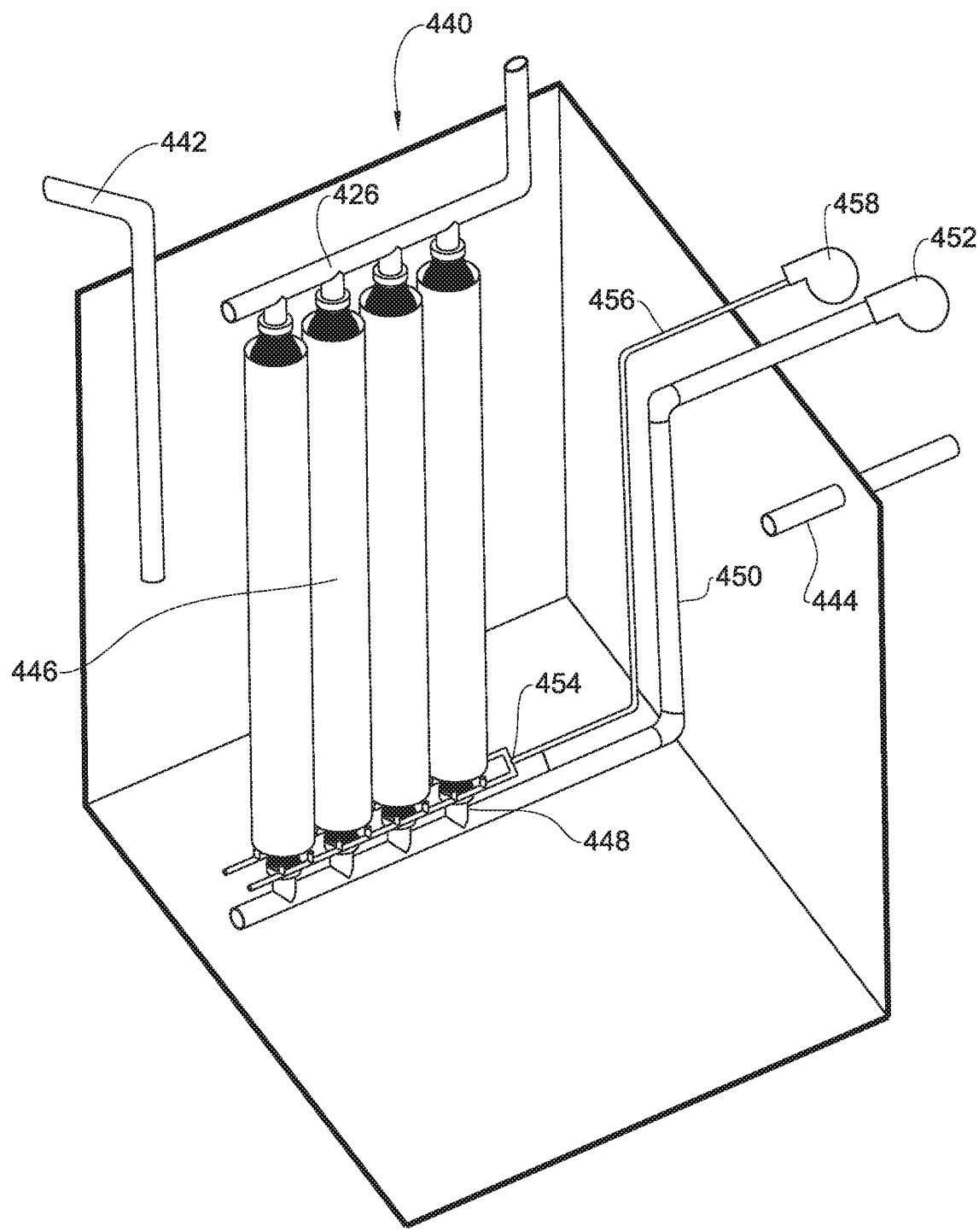
FIG. 5 is a schematic partial cross-section illustration of a water treatment tank including modules of the kind illustrated in FIGS. 1A-1C and 2A-2B.

A water treatment tank 440, in partial schematic cross-section, according to an embodiment of this disclosure, is illustrated in FIG. 5. Tank 440 includes a water inlet 442 linked to a source (not shown) of water to be treated and a water outlet 444 that discharges treated water out of the tank, for example, to a treated water reservoir or a secondary clarifier (not shown). Tank 440 is illustrated as holding a group 446 of four modules as illustrated in FIG. 2A, but similarly may house a plurality of groups 446 of modules, which may be of the kind illustrated herein.

In some embodiments that tank is an open tank. In other embodiments the tank has a top cover.

The tank 440 has also a BGSG inlet 448 linked, via BGSG supply line 450 to a BGSG source 452; and an AG inlet 454 linked, via an AG supply line 456 to an AG source 458. BGSG line of groups 446 may also have an exhaust outlet line 426 for discharging excess BGSG from the modules of groups 446.

As noted above, an MABR module having a generally cylindrical cross section configuration is exemplary; and by other exemplary embodiments, the general configuration may be prismatic, e.g. rectangular prismatic configuration of the kind shown in FIGS. 6A-6D.

The module 500 seen in FIGS. 6A-6D includes a bundle 502 of hollow fiber membranes (with some of the central fibers not shown for the purpose of illustration) with a treatment portion 504 extending between bottom end 506 and top end 508. Bottom and top ends 506, 508 are fitted in and held by respective cast potting elements 510, 512. A cuboid sleeve 514 or a sleeve that is differently shaped (e.g. a generally cuboid shape with rounded corners, one with an elliptical or oval cross-section) is fitted over and surrounds the bundles' treatment portion 504. Potting elements 510 and 512, which have a generally rectangular cross section, are fitted into the corresponding bottom and top rectangular fittings 516, 518 that are linked to BGSG conduit arrangement through respective gas lines 524, 526. Gas line 524 is linked to a BGSG source (not shown). Gas flows in gas line 524 in the general direction represented by arrow A3, then through the fibers and into line 526 where gas flows in the direction represented by arrow A4. The fibers which are gas permeable and water impermeable may be made out of any one of the polymers noted above in the description of embodiments of FIGS. 1A-2B.

The module 500 includes a dual diffuser arrangement with a set of peripheral diffusers 530 formed on a first AG supply line 532 surrounding the bundle's bottom end 506 and another set of diffusers formed within the confines of the bundle, and are constituted by nozzles 533 integrally formed in the potting element 510 and linked to AG supply line 532A through a conduit 535.

Accordingly, in a module of this embodiment, gas either continuously or intermittently flows out of the two sets of diffusers—out of diffusers 530 around the bundles' periphery and out of nozzles 533 within the confines of the bundle. For the peripheral diffusers 530, the sleeve 514 serves as a channeling element to guide the AG bubbles discharge by the peripheral diffusers 530 into the confines of the bundle 502 in their upward rise.

Sleeve 514 may structurally be supported in any of the manners described above. Also, in a manner analogous to that shown in FIGS. 3A-3C, the diffusers 530 may be located at a level below that of the BGSG line.

Figure 6A:
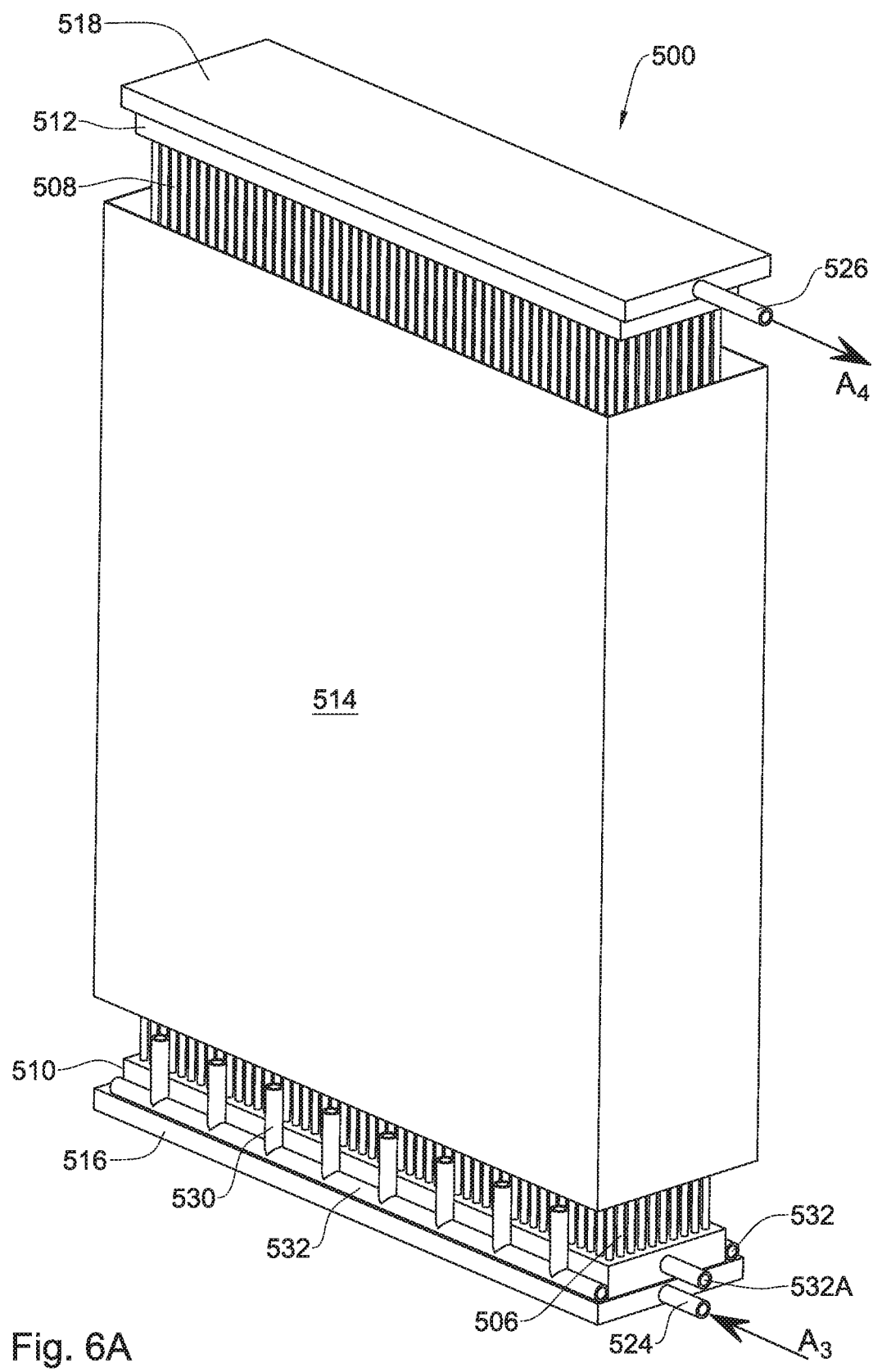
FIGS. 6A, 6B, 6C and 6D are schematic illustrations of a water treatment module in accordance with an embodiment of the present disclosure, including a perspective view (FIG. 6A), an exploded view (FIG. 6B), a perspective longitudinal cross-sectional view of the bottom portion with some of the central fibers not shown for the purpose of illustration (FIG. 6C) and a perspective horizontal cross-sectional view of the bottom end portion with the central fibers not shown for the purpose of illustration (FIG. 6D).
Figure 6B:
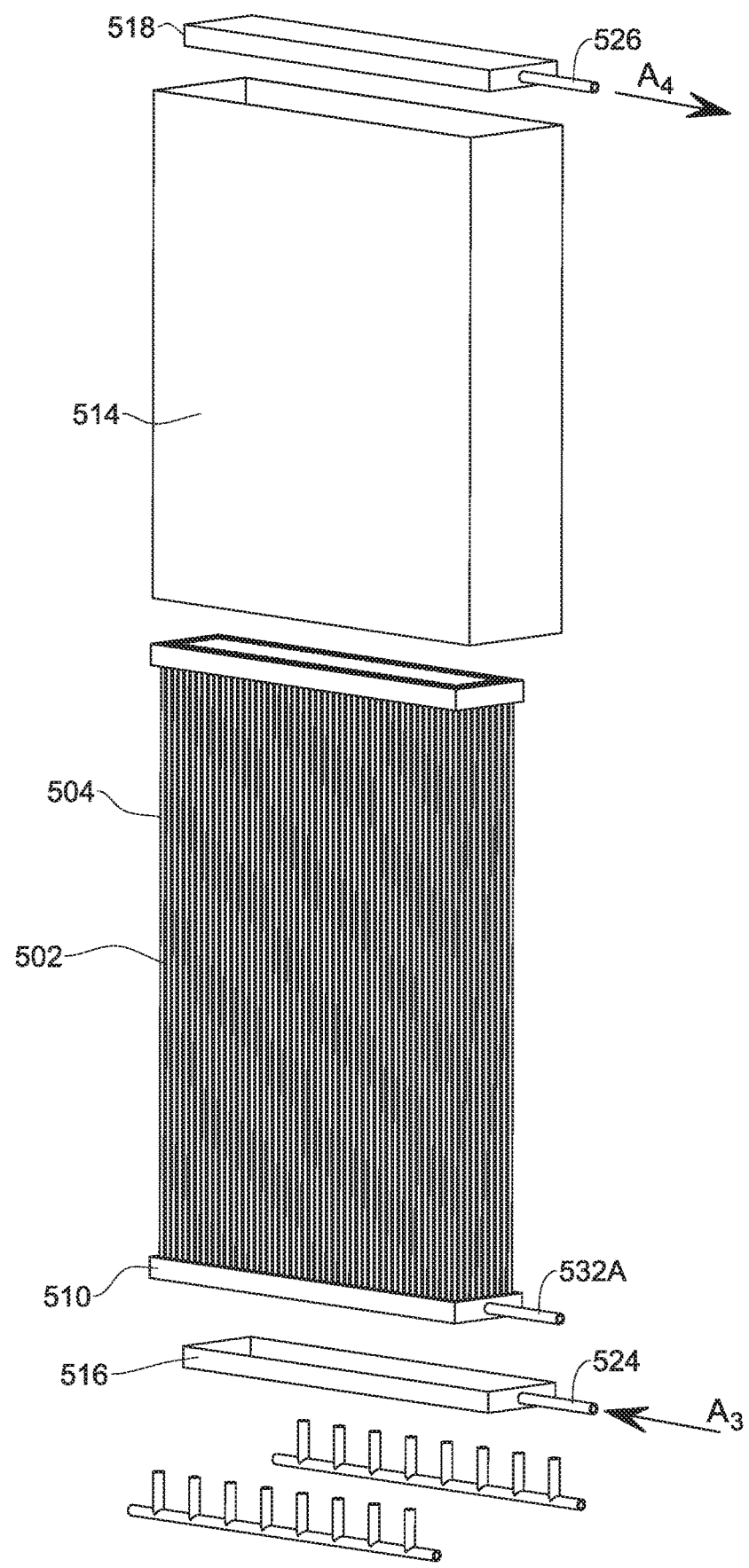
Figure 6C:
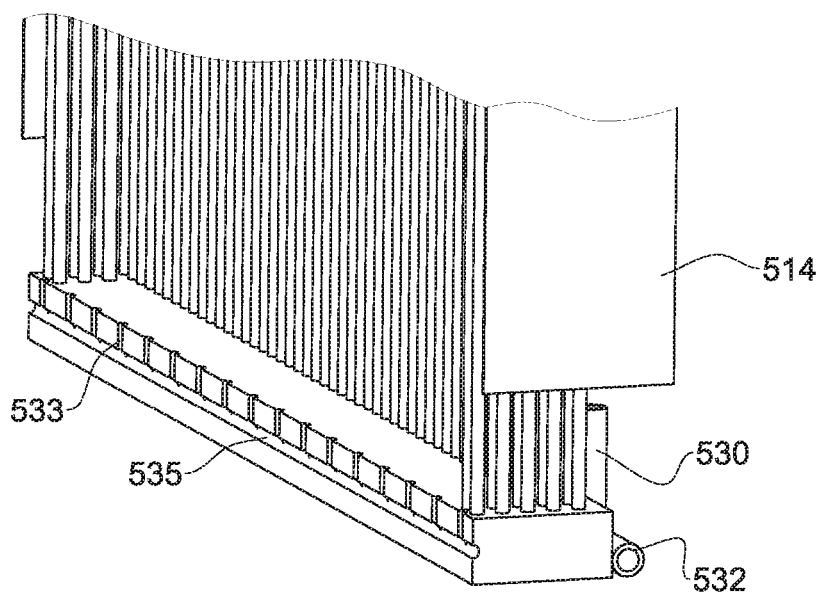
Figure 6D:
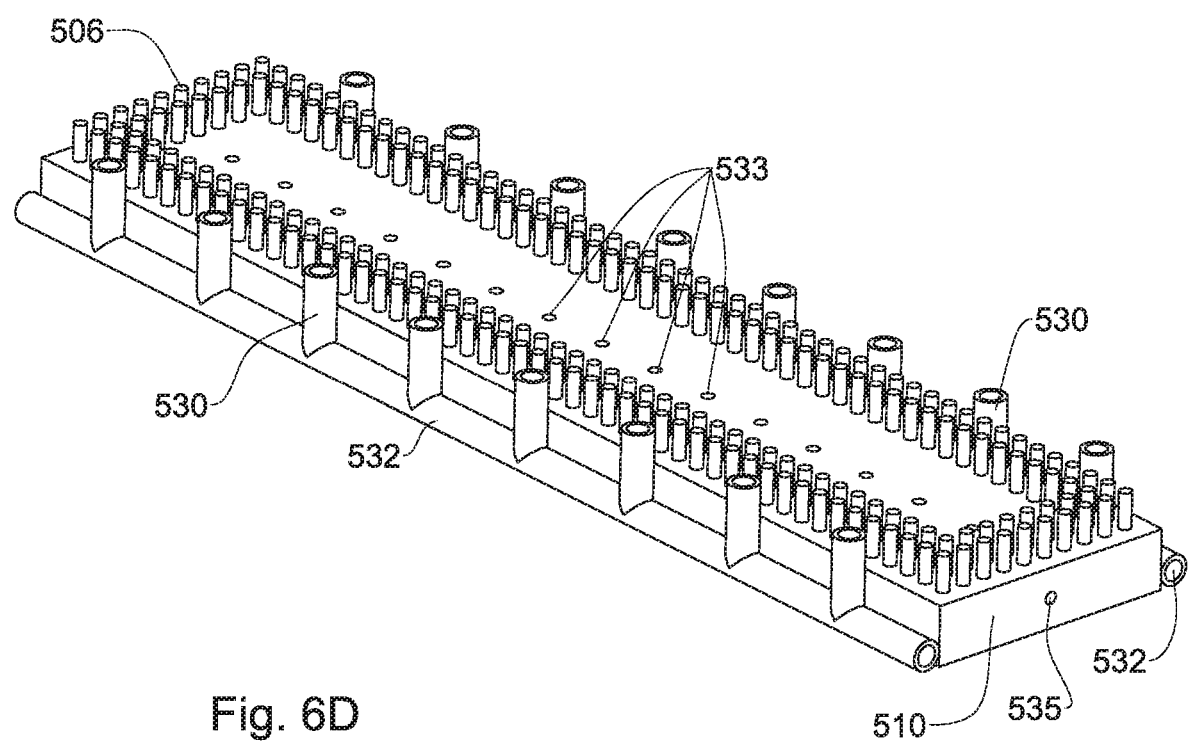

As appreciated, a module disclosed herein can, by other embodiments, have only gas diffusers outside the confines of the bundle of hollow fiber membrane, such as diffusers 530 in FIG. 6D, functionally operating with sleeve 514 to ensure that the bubbles of the discharged gas rise within the confines of the bundle of hollow fiber membranes; or only gas diffusers having gas discharging nozzles within the confines of the bundle of hollow fiber membranes, such as nozzles 533 in FIG. 6C; or combinations similar to those described above or others.

Figure 7:
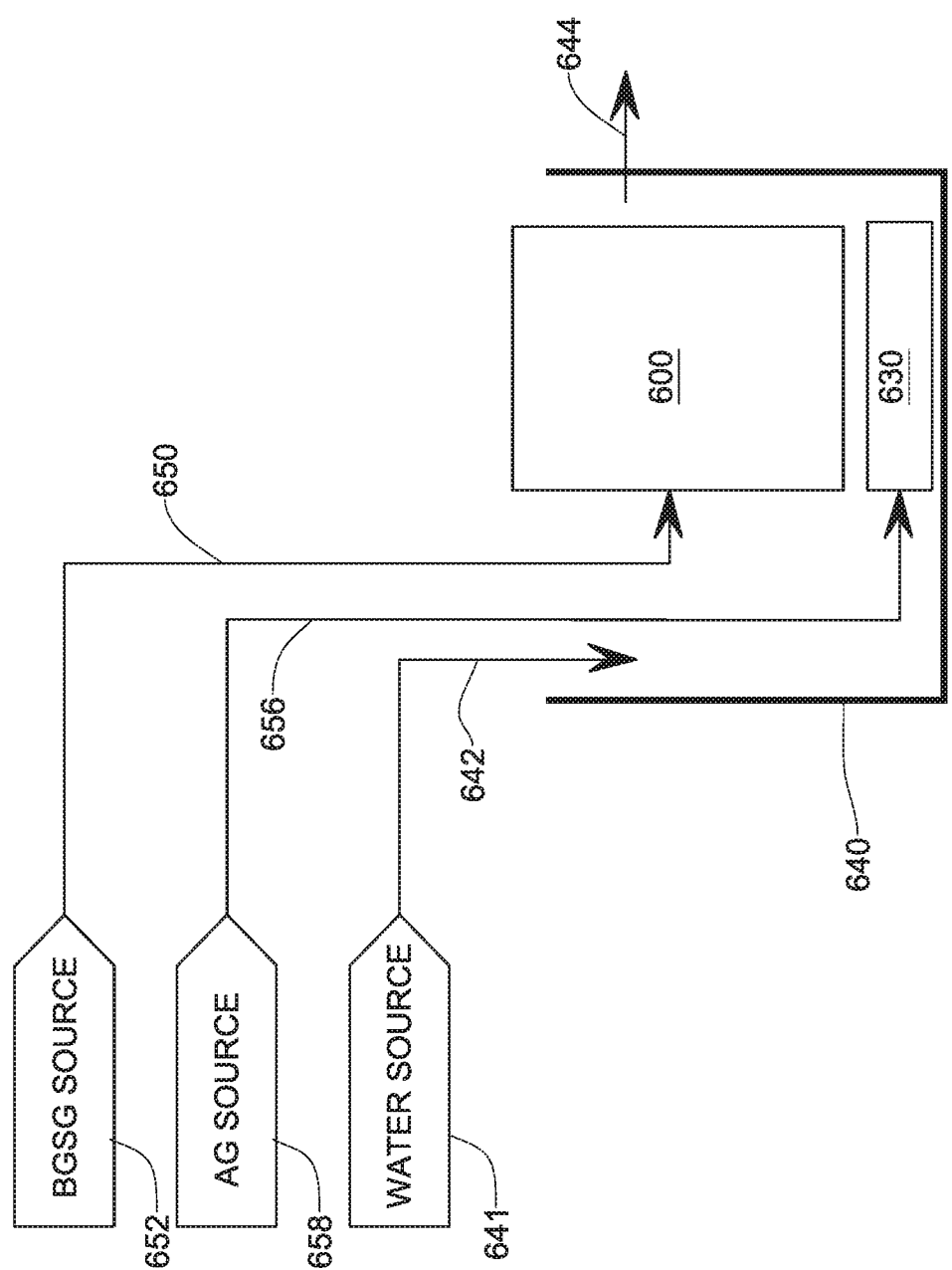
FIG. 7 is a schematic representation of a water treatment system according to an embodiment of this disclosure.

A system according to any embodiment of this disclosure is schematically illustrated in FIG. 7. This system includes one or more water treatment tanks 640 incorporating one or a plurality of MABR modules 600 according to this disclosure comprising AG diffusers 630. The tank 640 includes a water inlet 642 linked to a water source 641 of water to be treated. The system also includes a BGSG source 652 and an AG source 658 as well as respective BGSG and AG conduit arrangements 650, 656 linked to module 600 and diffusers 630 respectively. The BGSG and the AG may be the same or different, as discussed above. In one embodiment, the BGSG and AG are both air, provided at, respective, lower and a higher pressure.

The water treatment in the system of the invention may be performed, by some embodiments, in a batch-wise manner; or may be carried out in a continuous operational mode.

In one embodiment, treated water discharge 644 ensuing from tank 640 is directed to a secondary clarifier (not shown). Water to be treated from source 641 may be first mixed with activated sludge from the bottom of the clarifier before being fed into tank 640.

The invention claimed is:

1. A water treatment module comprising:
   a bundle of hollow fiber membranes that comprises a treatment portion extending between bottom and top ends and comprising at least one gas diffuser, the membranes being gas permeable and water impermeable;
   at least one end of the hollow fiber membranes being linked to a source of biofilm growth-supporting gas (BGSG) and configured to permit inlet of said BGSG into the hollow fiber membranes;
   the at least one gas diffuser being associated with the bottom end of the bundle of hollow fiber membranes and configured for discharging gas bubbles within the bundle's confines such that gas bubbles rise through the treatment portion between the fibers; and
   a channeling element for channeling the discharged gas bubbles into the confines of the bundle of hollow fiber membranes,
   wherein said channeling element is a sleeve element enveloping at least the bottom end portion of the bundle, wherein the channeling element comprises the sleeve element having solid sides with opposed top and bottom open ends, wherein the open ends are the only openings of the sleeve for channeling discharged gas bubbles into the confines of the bundle.

2. The water treatment module of claim 1, wherein the fibers in at least one of the bottom and top ends are held together.

3. The water treatment module of claim 1, comprising one or two potting elements associated, each, with an end of the bundle.

4. The water treatment module of claim 3, wherein the gas diffuser is a nozzle which is integrally formed with the bottom potting element.

5. The water treatment module of claim 3, wherein the potting elements are cast elements.

6. The water treatment module of claim 3, wherein the potting elements are cast over the end portions of the fibers.

7. The water treatment module of claim 1, wherein the gas diffuser comprises gas outlets positioned within the confines of the bottom end of the bundle.

8. The water treatment module of claim 1, wherein the gas diffuser comprises gas outlets positioned outside the confines of the bottom end of the bundle.

9. The water treatment module of claim 1, wherein the at least one gas diffuser is in a form of a nozzle integrally formed within a bottom potting element and wherein the bottom potting element is associated with and centrally positioned within the bottom end of the bundle of hollow fiber membranes.

10. The water treatment module of claim 1, wherein said channeling element comprises the sleeve element enveloping at least a majority the treatment portion.

11. A water treatment device comprising one or more modules of claim 1.

12. A water treatment system comprising:
one or more water treatment tanks, one or more water treatment modules within each of the tanks, a BGSG conduit arrangement for a biofilm growth-supporting gas (BGSG), a BGSG source linked thereto, an AG conduit arrangement for an auxiliary gas (AG) and an AG source linked thereto, the AG being the same or a different gas than the BGSG;
one or more of the treatment modules comprising
a bundle of hollow fiber membranes that comprises a treatment portion extending between bottom and top ends of the bundle, the membranes being gas permeable and water impermeable,
a gas diffuser associated with the bottom end and configured for discharging AG bubbles within the bundle's confines such that gas bubbles rise through the treatment portion between the fibers; and
a channeling element for channeling the discharged gas bubbles into the confines of the bundle, wherein said channeling element is a sleeve element enveloping at least the bottom end portion of the bundle, wherein the channeling element comprises the sleeve element having solid sides with opposed top and bottom open ends, wherein the open ends are the only openings of the sleeve for channeling discharged gas bubbles into the confines of the bundle;
the BGSG conduit arrangement being configured for supplying BGSG to the fibers in said bundle, and the AG conduit arrangement being configured for supplying AG to said diffuser.

13. The water treatment system of claim 12, wherein said water treatment tank comprises a plurality of said modules.

14. The water treatment system of claim 12, comprising more than one of said modules.

15. A water treatment method comprising:
permitting water to come into contact with one or more treatment modules, each of the treatment modules comprising a bundle of hollow fiber membranes, the membranes being gas permeable and water impermeable, the bundles having a treatment portion extending between a bottom end and a top end of the bundle and confined within a channeling element, wherein said channeling element is a sleeve element enveloping at least the bottom end portion of the bundle, wherein the channeling element comprises the sleeve element having solid sides with opposed top and bottom open ends, wherein the open ends are the only openings of the sleeve for channeling discharged gas bubbles into confines of the bundle;
introducing a biofilm growth-supporting gas (BGSG) into the hollow fiber membranes; and
permitting an auxiliary gas (AG), which may be the same or different than said BGSG, to discharge as AG bubbles such that they rise through the treatment portion within the channeling element and within the confines of the bundle and between the fibers.

16. The water treatment method of claim 15, comprising intermittently discharging or releasing said AG.

17. The method of claim 15, wherein the modules further comprise at least one gas diffuser, wherein at least one end of the hollow fiber membranes is linked to a source of biofilm growth-supporting gas (BGSG) and configured to permit inlet of said BGSG into the hollow fiber membranes, and wherein the at least one gas diffuser is associated with the bundle's bottom end and configured for discharging gas bubbles within the bundle's confines such that gas bubbles rise through the treatment portion between the fibers.

18. A method, comprising:
treating water in a membrane aerated biofilm reactor; and
discharging gas bubbles such that the bubbles rise through and within a channeling element configured to confine a treatment portion of a bundle of hollow fiber membranes of the reactor and to channel the discharged gas bubbles within the bundle of hollow fiber membranes, wherein said channeling element is a sleeve element enveloping at least a bottom end portion of the bundle, wherein the channeling element comprises the sleeve element having solid sides with opposed top and bottom open ends, wherein the open ends are the only openings of the sleeve for channeling discharged gas bubbles into confines of the bundle.

19. A membrane aerated biofilm reactor comprising (i) a gas diffuser configured for discharging gas bubbles that rise through and within confines of a treatment portion of a bundle of hollow fiber membranes of the reactor; and (ii) a channeling element configured to confine the treatment portion and to define a rising path for said discharged gas bubbles, wherein said channeling element is a sleeve element enveloping at least a bottom end portion of the bundle, wherein the channeling element comprises the sleeve element having solid sides with opposed top and bottom open ends, wherein the open ends are the only openings of the sleeve for channeling discharged gas bubbles into the confines of the bundle.

20. A water treatment module comprising:
a bundle of hollow fiber membranes that comprises a treatment portion extending between bottom and top ends and comprising at least one gas diffuser, the membranes being gas permeable and water impermeable and a channeling element configured to channel gas bubbles into confines of the bundle, wherein said channeling element is a sleeve element enveloping at least the bottom end portion of the bundle, wherein the channeling element comprises the sleeve element having solid sides with opposed top and bottom open ends, wherein the open ends are the only openings of the sleeve for channeling discharged gas bubbles into the confines of the bundle;

at least one end of the hollow fiber membranes being linked to a source of biofilm growth-supporting gas (BGSG) and configured to permit inlet of said BGSG into the hollow fiber membranes; and the at least one gas diffuser in a form of a nozzle integrally formed within a bottom potting element and wherein the bottom potting element is associated with and centrally positioned within the bottom end of the bundle of hollow fiber membranes, the at least one gas diffuser configured for discharging the gas bubbles within the bundle's confines such that gas bubbles rise through the treatment portion between the fibers.

\* \* \* \* \*